(12) United States Patent
Yilmaz

(10) Patent No.: US 6,195,969 B1
(45) Date of Patent: Mar. 6, 2001

(54) APPARATUS FOR MULTIFUNCTIONAL LAWN MOWER AND MULTIDIRECTIONAL SHELL

(76) Inventor: Gürsel George Yilmaz, 28202 Meadowlark La., Bonita Springs, FL (US) 34134

( * ) Notice: Subject to any disclaimer, the term of this patent is extended or adjusted under 35 U.S.C. 154(b) by 0 days.

(21) Appl. No.: 09/285,592

(22) Filed: Apr. 3, 1999

(51) Int. Cl.[7] .................................................. A01O 34/64
(52) U.S. Cl. .............................................. 56/14.7; 56/14.9
(58) Field of Search .................................. 56/16.7, 17.1, 56/14.7, 17.4, 17.5, 2, 14.9

(56) References Cited

U.S. PATENT DOCUMENTS

| 3,797,213 | * | 3/1974 | Sadow, Jr. et al. | 56/17.4 |
|---|---|---|---|---|
| 4,326,370 | * | 4/1982 | Thorud | 56/17.5 |
| 4,744,580 | * | 5/1988 | Ryan | 56/6 |
| 4,916,889 | * | 4/1990 | Molstad | 56/14.9 |
| 4,951,449 | * | 8/1990 | Thorud | 56/2 |
| 5,163,275 | * | 11/1992 | Hare et al. | 56/16.7 |
| 5,572,856 | * | 11/1996 | Ku | 56/17.5 |
| 5,826,414 | * | 10/1998 | Lenczuk | 56/16.7 |
| 5,910,091 | * | 6/1999 | Iida et al. | 56/16.7 |
| 6,058,508 | * | 7/2000 | Miatt et al. | 56/17.1 |

* cited by examiner

Primary Examiner—Robert E. Pezzuto
Assistant Examiner—Nathan Mammen

(57) ABSTRACT

A multifunctional riding lawn mower for cutting grass, collecting or discharging cut grass clippings, and mulching cut grass clippings into the cut grass. The mower includes a body and a power source connected to the body. Wheels are connected to the body and powered by the power source. The mower has a multidirectional shell connected to the body. The shell has a circulation section and a distribution section on opposite side of the center of the shell. The shell is capable of being turned. When the circulation section matches the front section of the body, the mower cuts grass and mulches the grass clippings. When the distribution section matches the front section of the body, the mower cuts grass and collects the grass clippings.

7 Claims, 6 Drawing Sheets

MULCHING POSITION

DISCHARGE AND COLLECTION POSITION

APPARATUS FOR MULTIFUNCTIONAL LAWN MOWER AND MULTIDIRECTIONAL SHELL

FIELD OF THE INVENTION

The present invention lies in the field of mechanical engineering and more particularly improving landscape lawn mowers.

BACKGROUND OF THE INVENTION

Present invention replaces separate lawn mowers for mulching, side discharge, and rear bag collection of grass clippings into one multifunctional lawn mower. Said multifunctional lawn mower consists of a multidirectional shell and a rotational blade and a reversible handle. Said multidirectional shell is used for in situ mulching and side discharge and bag collection of grass and weed clippings by incorporating variables of said rotational blade and its angle relative to ground surface and direction of said multidirectional shell. Said multidirectional shell has a circulation section and a distribution section and in between has a center preferably under which said rotational blade is connected to said multidirectional shell at an angle relative to ground surface facing circulation section. Said multidirectional shell is moved and controlled by using said reversible handle which is connected to said shell on the sides of the center. Said multidirectional shell functions as a mulching mower when moved in the direction of circulation section and functions as a side discharge and rear bag collection mower when moved in the direction of distribution section.

SUMMARY OF THE INVENTION

Present invention improves weed and grass mowers, hereafter lawn mowers, which has a power source such as an electric motor or a gasoline engine and has a rotational blade which is powered by said power source to cut grass and weeds. Said power source provides power to both the wheels of self propelled lawn mower and the rotational blade. Present invention replaces separate lawn mowers for mulching, side discharge, and rear bag collection into one multifunctional lawn mower. Said multifunctional lawn mower consists of a multidirectional shell and a rotational blade and a reversible handle. Said multidirectional shell is used for in situ mulching and side discharge and rear bag collection of grass and weed clippings by incorporating variables of rotational blade and its angle relative to ground surface and direction of said multidirectional shell. Said multidirectional shell has a circulation section and a distribution section and in between has center section preferably under which said rotational blade is connected to said multidirectional shell at an angle relative to ground surface facing circulation section. Said multidirectional shell is moved and controlled by using said reversible handle which is connected to said shell on the sides of the center section. Said multidirectional shell functions as a mulching mower when moved in the direction of circulation section and functions as a side discharge and rear bag collection mower when moved in the direction of distribution section.

DETAILED DESCRIPTION OF THE PREFERRED EMBODIMENTS

Figure 1:
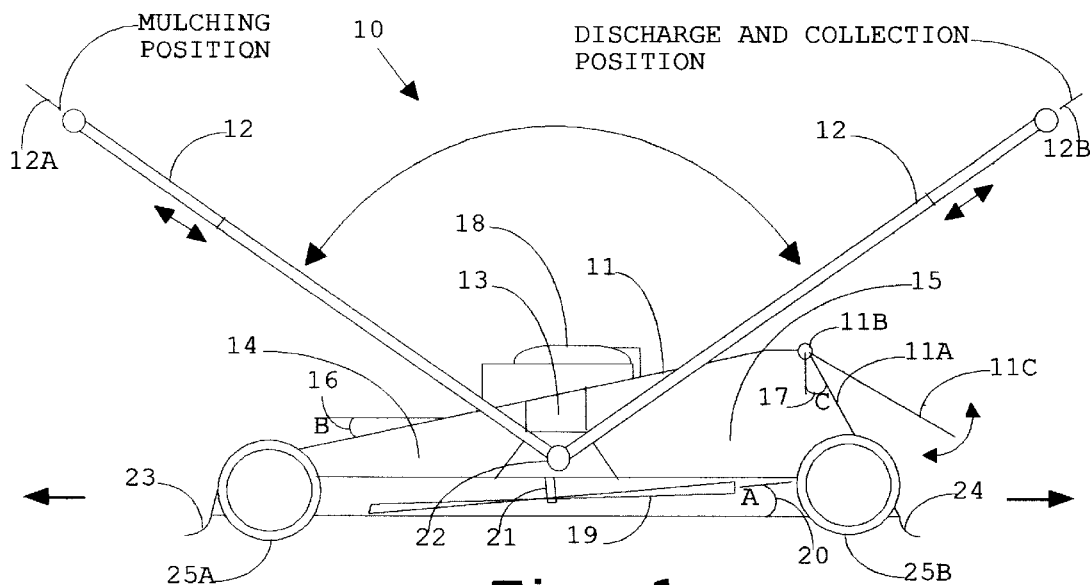
FIG. 1 is a side view of a multifunctional lawn mower showing multidirectional shell and reversible handle positioned at both mulching and discharge and collection positions.

FIG. 1 shows a side view of a multifunctional lawn mower 10 including multidirectional shell 11 and reversible handle 12 which is positioned at plane 12A to operate as a mulching lawn mower and positioned at 12B to operate as a discharge and collection lawn mower. Said handle is preferred to be adjustable in length. FIG. 1 also shows a center section 13 and a distribution section 14 with an elastic distribution cover 23 and a circulation section 15 with elastic circulation cover 24 of shell 11. Multidirectional shell 11 consists of two primary defining cross sectional angles of distribution angle 16 shown as B and circulation section angle 17 shown as C both of which said angles 16 and 17 are opposite of each other from the center 13 as shown in FIG. 1. A collection port 11A is covered by a collection port cover 11C using collection port connector 11B which connects said cover 11C to said shell 11 as shown in FIG. 1. A power source 18 is connected to multidirectional shell 11 and a rotary blade 19 is set at an angle of 20 shown as A relative to ground beneath said shell 11 as shown in FIG. 1. Said blade 19 is powered by said power source 18 using main power transmitter 21 which connects said rotary blade 19 and power source 18 as shown in FIG. 1. A self locking device 22 connects reversible handle 12 and multidirectional shell 11 and secures said handle at desired positions such as 12A and 12B.

Figure 2:
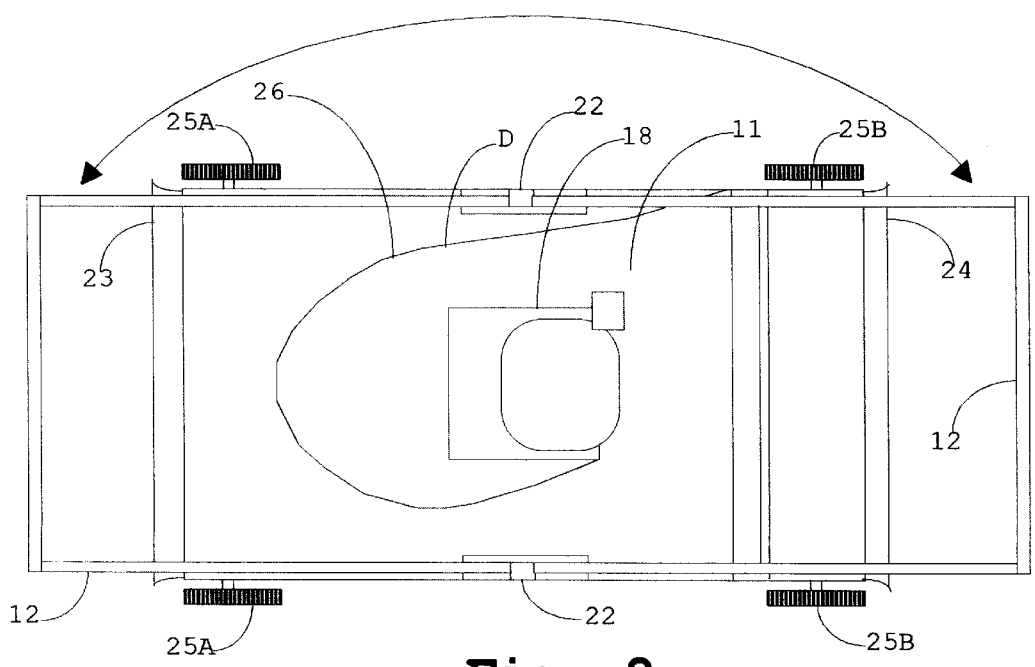
FIG. 2 is a top view of a multifunctional lawn mower showing multidirectional shell and wheels and reversible handle positioned at both mulching and discharge and collection positions.

FIG. 2. shows a top view of a multifunctional lawn mower showing a pair of wheels 25A and 25B connected multidirectional shell 11, and defining horizontal functional curve of 26 shown as D which shapes top of multidirectional shell 11 between angles 16 and 17.

Figure 3:
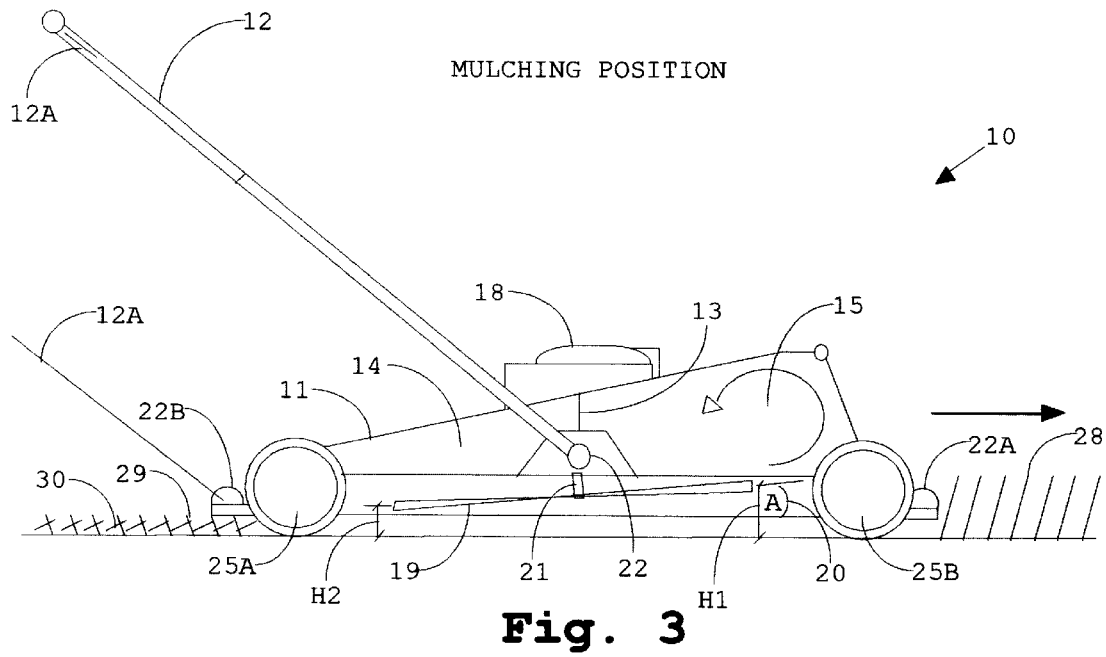
FIG. 3 is a side view of a multifunctional lawn mower showing rotational blade set with an angle facing circulation section and multidirectional shell positioned to move in the direction of circulation section and reversible handle positioned to move lawn mower in the direction of circulation section.
Figure 4:
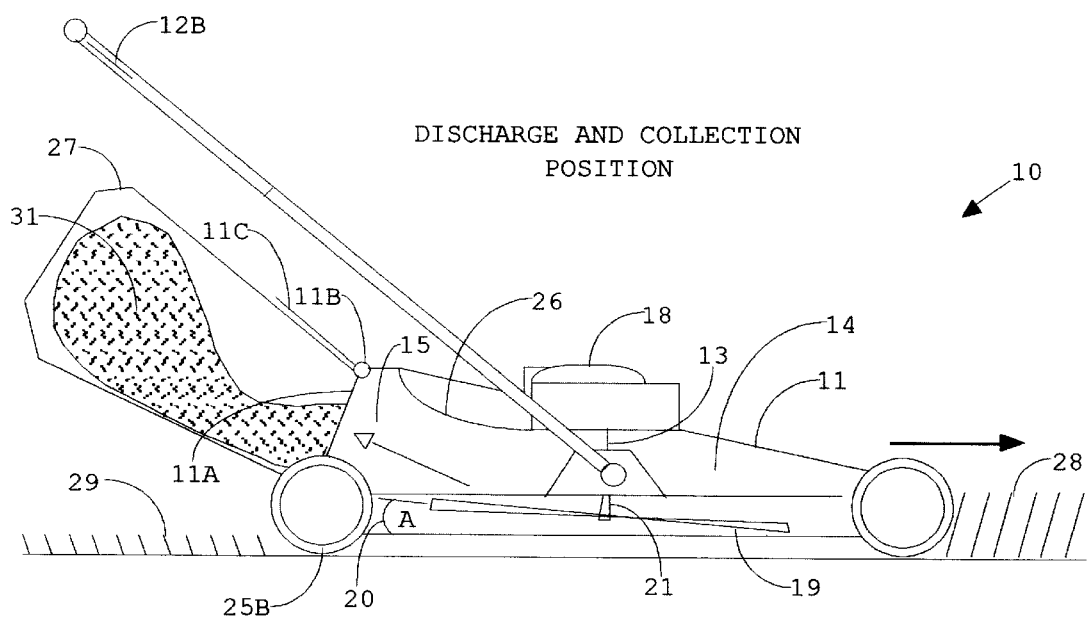
FIG. 4 is a side view of a multifunctional lawn mower showing rotational blade set with an angle facing circulation section and both reversible handle and multidirectional shell positioned to move in the direction of discharge section and a rear collection bag connected to multidirectional shell using discharge port.

FIG. 3 shows a multifunctional lawn mower apparatus 10 to cut grass and to mulch cut grass clippings into the cut grass. Said multifunctional lawn mower 10 comprises of a multidirectional shell 11 having a circulation section 15 and a distribution section 14 in opposite sides from the center 13. Said shell 11 is moved forward in the direction of circulation section 15 to function as a mulching mower as shown in FIG. 3 and moved forward in the direction of distribution section 14 to function as a discharge and collection lawn mower as shown in FIG. 4. Both FIG. 3 and FIG. 4 show a rotary blade 19 connected to said shell 11 and is set at an angle of 20 shown as A relative to ground beneath said shell 11. A power source 18 is connected to said shell 11 and powers said rotary blade 19 using main power transmitter 21. A reversible and adjustable handle 12 is connected to said main shell 11 at the center 13 between said circulation section 15 and distribution section 14. FIGS. 3–4 show a reversible and adjustable handle 12 positioned at 12A and 12B to move lawn mower 10 and its shell 11 in the direction of circulation section 15 and in the direction of distribution section 14 from the center 13 to function as mulching mower and bag collection mower respectively. A collection port 11A is connected to circulation section 15 of said shell 11 and a collection port cover 11C is connected to said collection port 11A using collection port connector 11B shown at open position while a collection bag 27 is connected to said shell 11 as demonstrated in FIG. 4. A collection bag 27 is connected to said shell 11 using said collection port 11A for discharge and collection of cut grass clippings 31. A self locking device 22 is connected to said multidirectional shell 11 and said reversible handle 12 and secures said handle 12 at desired positions such as 12A and 12B as shown in FIG. 3 and FIG. 4 respectively. FIG. 3 shows power connectors 22A and 22B for towing and pushing said shell 11 and said power connectors connects said shell 11 with a power source designed to tow and push said shell 11 using 22A or 22B.

FIG. 3 also shows grass 28 being cut by multifunctional lawn mower 10 using rotary blade 19 set at an angle of 20 which cuts grass 28 in increments shorter and shorter from height of H1 down to H2 due to said angle 20 as said shell 11 moves forward. Cut grass clippings are circulated in circulation section 15 and is cut further depending on the speed of said shell 11 and rotational velocity of said blade 19 before discharged from distribution section 14 into to cut grass 29 in the form of mulch 30.

FIG. 4 shows grass 28 being cut by multifunctional lawn mower 10 using rotary blade 19 set at without or with an angle of 20 which cuts grass 28 as shell 11 moves forward by manually using handle 12 or by wheels 25B powered by power source 18. Cut grass clippings are moved to circulation section 15 from distribution section 14 before discharged to collection bag 27 through collection port 11A and collected in the form of grass clippings 31 and cut grass 29 is left free of grass clippings. Collection bag 27 is connected to shell 11 using collection port 11A by means of opening collection port cover 11C using collection cover connector 11B as shown in FIG. 4.

FIGS. 1–4 show a combination of variables including blade angle 20, defining horizontal shell angle 16 and vertical shell angle 17 of section 15, and a functional shell curve 26. Functional shell curve 26 connects said vertical angle 17 and horizontal angle 16 in both horizontal and vertical dimensions all of which define the shell 11 to work as a function of direction of shell 11. Above mentioned variables in aggregation and combination result in a multidirectional shell which functions a bag collection lawn mower and mulching lawn mower and side discharge lawn mower.

Figure 5:
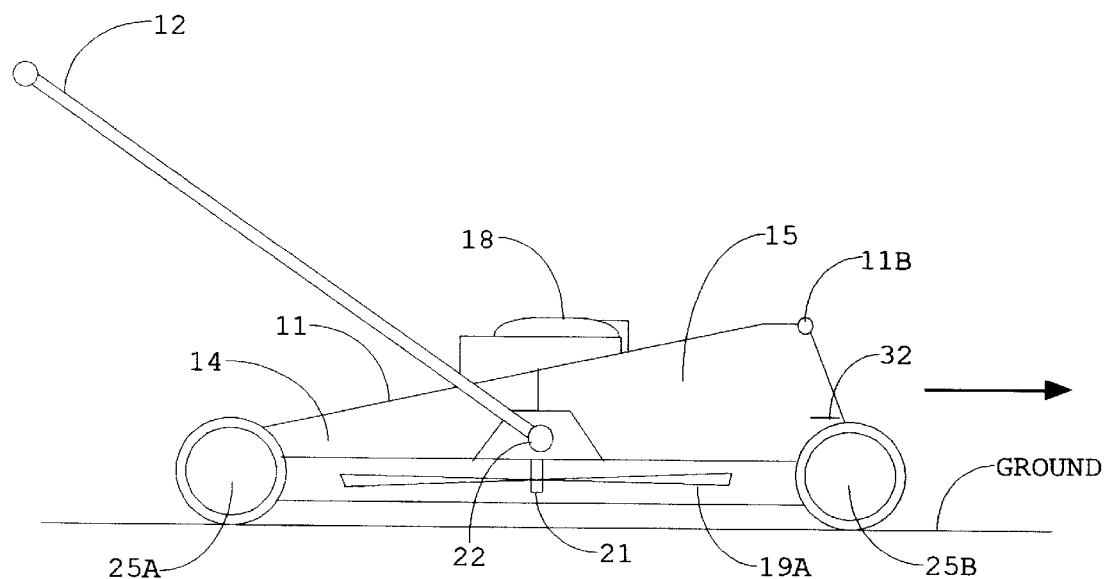
FIG. 5 is a side view of a multifunctional lawn mower showing rotational blade set with no angle and multidirectional shell positioned to move in the direction of circulation section and reversible handle positioned to move lawn mower in the direction of circulation section.
Figure 6:
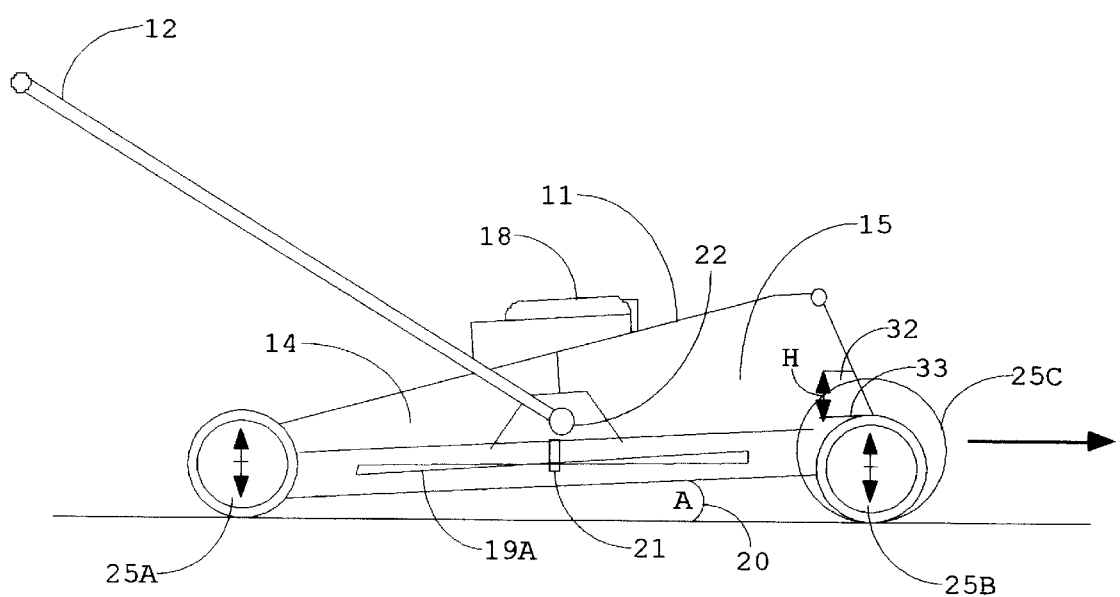
FIG. 6 is a side view of a multifunctional lawn mower showing rotational blade set with an angle facing circulation section using wheel height adjustments and multidirectional shell positioned to move in the direction of circulation section using reversible handle.

FIG. 5 shows a side view of a multifunctional lawn mower 10 including rotational blade 19A which is positioned parallel to the ground and set with no angle relative to ground. Multidirectional shell 11 positioned to move in the direction of circulation section 15 and reversible handle 12 is also positioned to move lawn mower in the direction of circulation section 15. FIG. 6 shows two alternatives through which an angel of 20, shown as A, is established using adjustable same size pairs of wheels 25A and 25B. Circulation section 15 of multidirectional shell 11 is raised to level 33 from level 32 by H using wheel adjustments as shown in FIG. 6 to achieve angle 20. Same angle of 20 can be achieved by using a larger wheel 25C which is larger in diameter by H corresponding level 32. Therefore a combination of wheel adjustments and different wheel sizes in diameter can be used to establish a desired angle of 20, shown as A in FIGS. 5–6.

Figure 7:
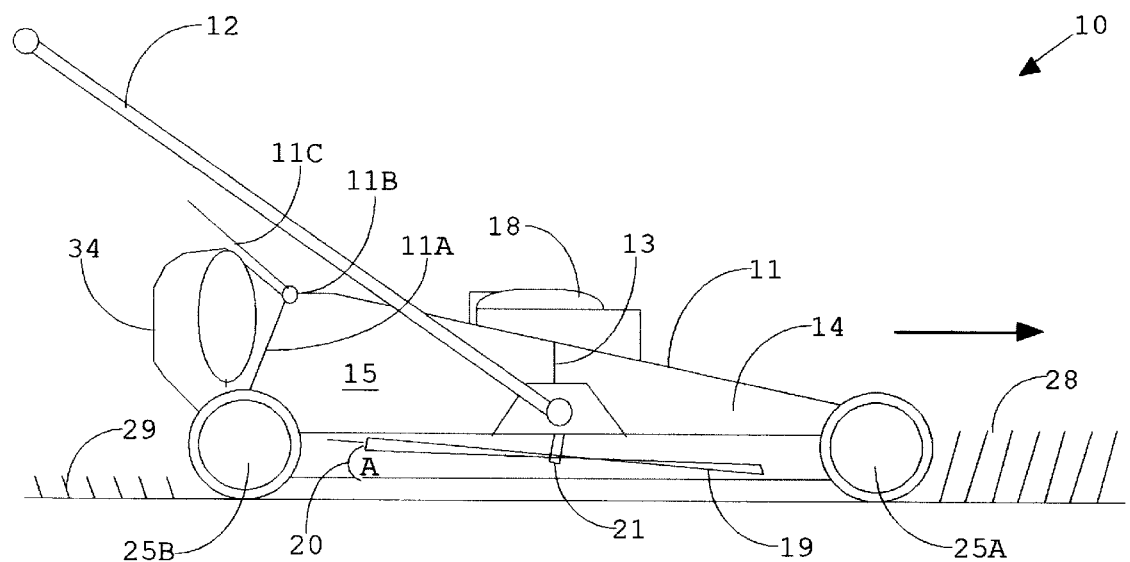
FIG. 7 is a side view of a multifunctional lawn mower showing rotational blade and its angle and multidirectional shell positioned to move in the direction of discharge section and reversible handle positioned to move lawn mower in the direction discharge section and secondary side discharge shell connected to multidirectional shell.
Figure 8:
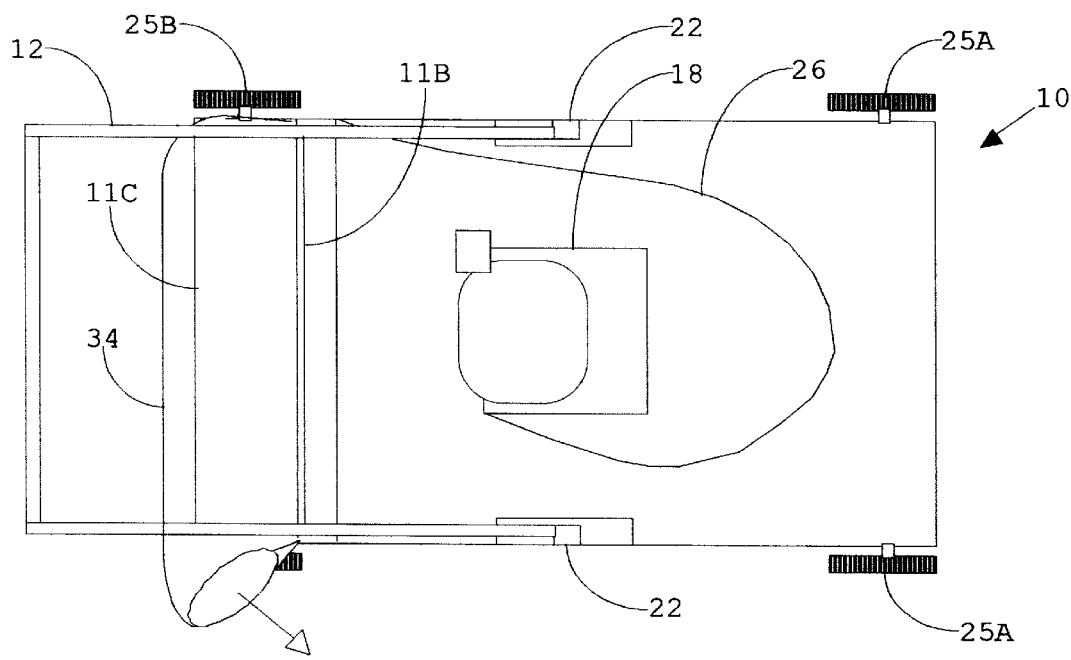
FIG. 8 is a top view of a multifunctional lawn mower showing multidirectional shell positioned to move in the direction of discharge section and reversible handle positioned to move lawn mower in the direction of discharge section and secondary side discharge shell connected to multidirectional shell.

FIG. 7 and FIG. 8 show a side and top view of multidirectional shell 11 positioned to function as a side discharge lawn mower including rotational blade 19 set with an angle 20 shown as A facing circulation section 15. Multidirectional shell 11 is positioned to move in the direction of distribution section 14 and reversible handle 12 positioned to move lawn mower in the direction of zone of distribution 14. A secondary discharge shell 34 is connected to said multidirectional shell 11 using collection port 11A. Collection port 11A is opened using collection port cover 11C and port cover connector 11B. Port cover connector 11B is preferred to be rotational and connected to 11C and 11A. FIG. 7 also shows grass 28 is being cut by rotational blade 29 as multifunctional lawn mower 10 and its shell 11 moves forward in the direction of distribution section 14. Cut grass clippings are moved to circulation section 15 from distribution section 14 to be discharged through secondary discharge shell. 34.

FIG. 8 shows a top view of a multifunctional lawn mower 10 showing multidirectional shell 11 positioned to move in the direction of distribution section 14. A reversible handle 12 is also positioned to move lawn mower 10 in the direction of distribution section 14 and secondary discharge shell 34 is connected to said multidirectional shell 11. Secondary discharge shell is utilized for side discharge of grass clippings.

Figure 9:
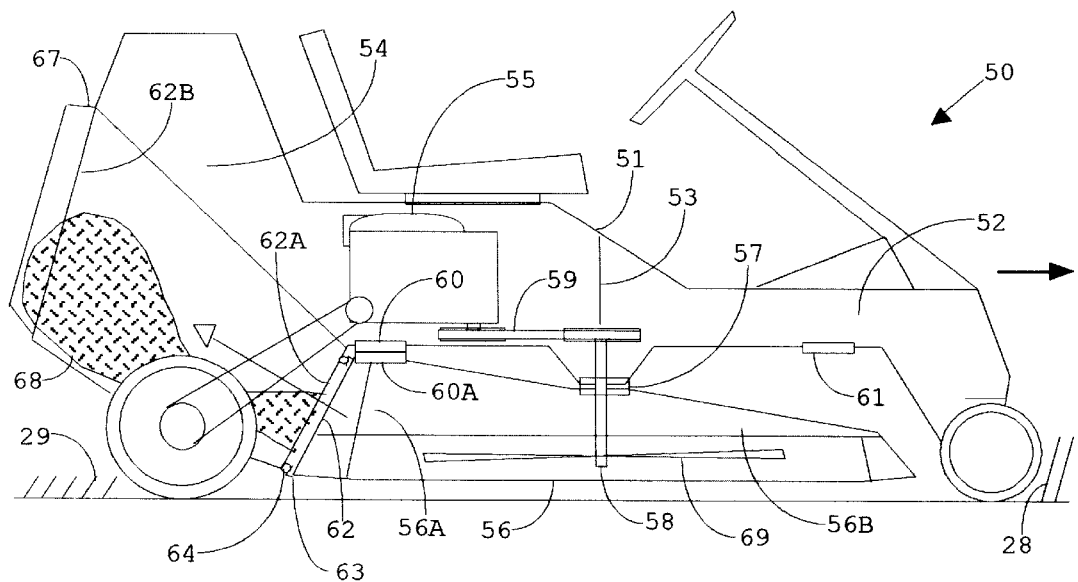
FIG. 9 is a side view of ride lawn mower having a body positioned and adjusted to function as a collection lawn mower including a power source and a multidirectional shell connected to said body and a collection bag and a positioning device.

FIG. 9 is a side view of a ride lawn mower 50 positioned and adjusted to function as a collection lawn mower including center 53, front 52, and end section 54 of the body 51. FIG. 9 also shows a power source 55 and a multidirectional shell 56 connected to said body 51 having a circulation section 56A and a distribution section 56B and collection bag 67 connected to collection port 62 and a positioning device 57. Collection port 62 allows collection bag 67 be connected to multidirectional shell 56 through openings 62A and 62B of body 51. Said connection is further sealed by one or preferably two sealers 63 and 64 as shown in FIG. 9. Power from power source 55 is transmitted to rotational blade 69 through a power transmission system preferably using elastic belts 59 and shaft 58. Said blade 69 is connected to shaft 58 and multidirectional shell 56 using and through positioning device 57. Shell connectors 60 and 61 and 60A all of which permit multidirectional shell 56 to be adjusted and positioned to operate as a multifunctional shell. Grass 28 is cut by ride lawn mower 50 which is positioned to function as a collection mower using rotational blade 69 set with no angle relative to the ground and cut grass 68 is discharged into collection bag 67 through discharge port 62.

Figure 10:
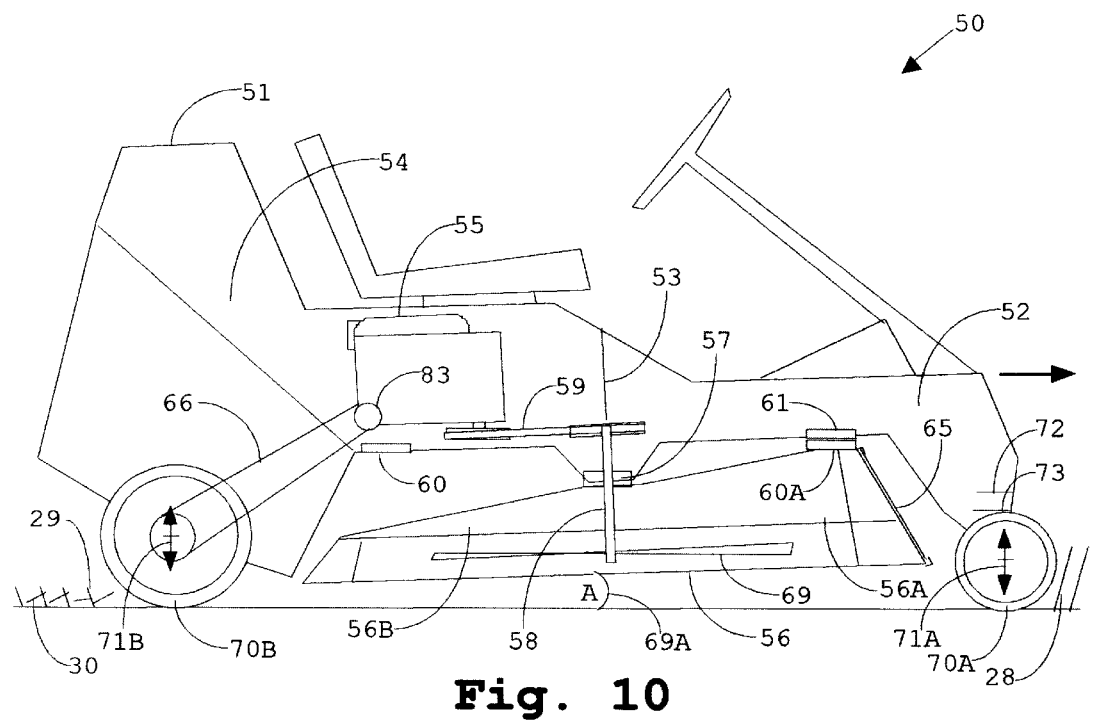
FIG. 10 is a side view of ride lawn mower having a body positioned and adjusted to function as mulching lawn mower including a power source and a multidirectional shell connected to said body and a positioning device.

FIG. 10 is a side view of a ride lawn mower 50 positioned and adjusted to function as a mulching lawn mower including center 53, front 52, and end section 54 of the body 51. FIG. 10 also shows a power source 55 and a multidirectional shell 56 connected to said body 51 and wheel 70B shown as being powered by 55 using belt 66. Circulation section 56A of said shell 56 is positioned to correspond front section 52 of the body 51 using shell connectors 61 and 60A and distribution section 56B of said shell 56 corresponds to end section 54 of body 51. Power from power source 55 is transmitted to rotational blade 69 through a power transmission system preferably using elastic belts 59 and shaft 58. Said blade 69 is connected to shaft 58 and multidirectional shell 56 trough positioning device 57. Shell connectors 61 and 60A and positioning device 57 permit multidirectional shell 56 to be adjusted and positioned to operate as a multifunctional shell. Angle of A shown as 69A in FIG. 10 is preferred to be established by adjustments 71A and 71B using adjustable wheels 70A and 70B. Adjustable wheel 70A is adjusted from level 72 to 73 to achieve an angle of 69A shown as A. Grass 28 is cut by ride lawn mower 50 using rotational blade 69 which is set with an angle of 69A relative to the ground. Cut grass is circulated in circulation section 56A where grass is incrementally cut and moved to distribution section 56B from which incrementally cut and re-cut grass 30 is discharged and uniformly distributed into the cut grass 29 from distribution section 56B.

Figure 11:
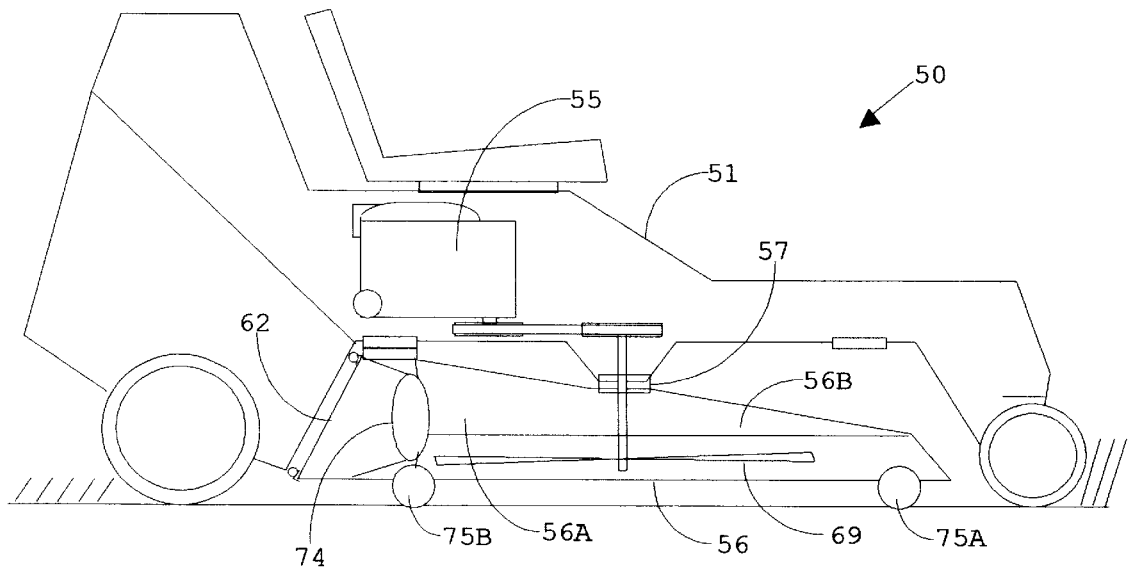
FIG. 11 is a side view of ride lawn mower positioned and adjusted to function as a side discharge lawn mower including a power source and a multidirectional shell and a secondary side discharge shell connected to said multidirectional shell.

FIG. 11 shows a ride lawn mower 50 positioned and adjusted to function as a side discharge lawn mower including a power source 55 and a multidirectional shell 56 which is connected to said body 51. Shell 56 has a circulation section 56A and a distribution section 56B and secondary discharge shell 74 connected to circulation section 56A of said shell 56 and a positioning device 57 which positions shell 56. FIG. 11 also shows pairs of optional multifunctional shell wheels 75A and 75B to further adjust and support said shell 56.

Figure 12:
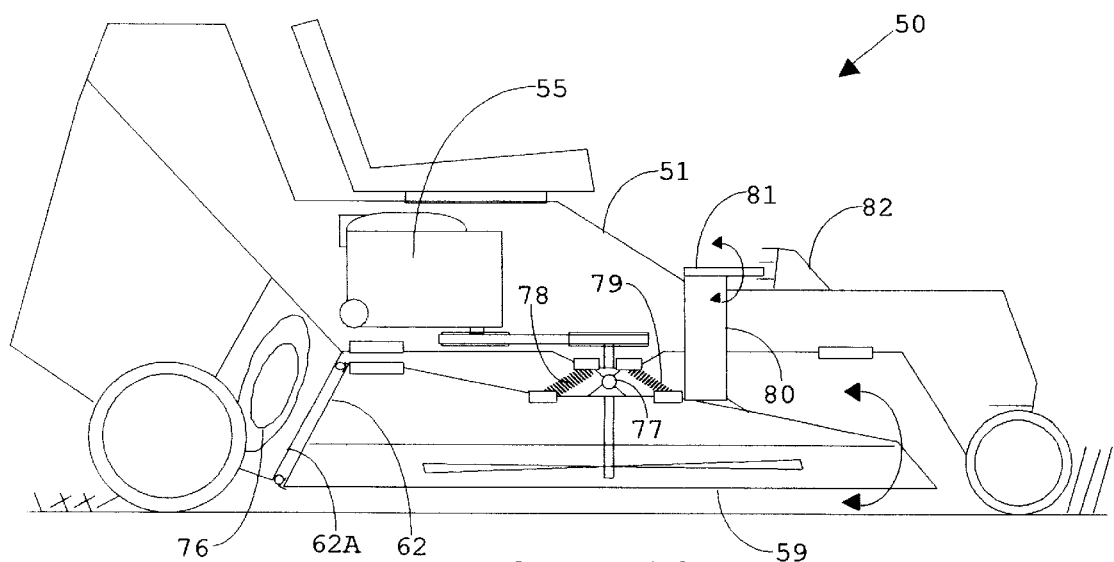
FIG. 12 is a side view of ride lawn mower having a body positioned and adjusted to function as a side discharge lawn mower including a multidirectional shell and secondary body discharge shell connected to said body and a universal joint and a rotational blade.

FIG. 12 shows a side view of ride lawn mower 50 also positioned and adjusted to function as a discharge lawn mower including the body 51 and a power source 55 and a multidirectional shell 56 which is connected to said body 51. Multidirectional shell 56 has a circulation section 56A and a distribution section 56B both of which positioned to function as a discharge lawn mower. A secondary body discharge shell 76 is connected to said body 51 and through opening 62A is connected to 62. A universal joint 77 connects said shell 59 and rotational blade 69 to the body 51 and power source 55 respectively. Multidirectional shell 56 is adjusted and positioned using universal joint 77 including elastic stabilizers 78 and 79 and using adjustment system including fixed rods of 80 and 81 and lock 83 as shown in FIG. 12.

The present invention incorporates variables of rotational blade angle 20, direction of multifunctional shell, and defined shape of multifunctional shell 11 using defining angles of 16 and 17 and curve 26 as shown in FIG. 1 Said variables give multifunctional lawn mower such as 10 and 50 unique ability to function as a mulching lawn mower and side discharge and bag collection lawn mower if moved in opposite directions from the center of said shell. This novel approach provides the following primary benefits and uses ability to operate over overgrown long grass as a mulching mower by means of cutting long grass in increments into short grass clippings which then is mulched into the cut grass and distributed uniformly, one lawn mower with no additional parts (except collection bag) is used for cutting grass for mulching and bag collection of grass clippings, same rotary blade is used for both mulching and collection of grass clippings, quality of distribution and cut length of grass clippings can easily be adjusted using angle of rotary blade adjustments, does not need conversion from collection mower to mulching mower except changing the direction of the lawn mower by means of using same reversible handle in two different opposite positions, same handle and same shell and same blade is utilized without modifications to function as a multifunctional lawn mower for mulching, side discharge, and bag collection.

While I have fully shown and described embodiments of apparatus for multifunctional lawn mower and multidirectional shell no limitations as to the scope of the present invention should be implied from the foregoing description. The true scope of the present invention is limited only by the following claims.

I claim:

1. Multifunctional ride lawn mower apparatus to cut grass, to collect or discharge cut grass clippings and to mulch cut grass clippings into the cut grass comprising a body having a center and front and end sections, a power source connected to said body, at least three adjustable wheels connected to said body and powered by said power source, a multidirectional shell connected to said body and having a circulation section and a distribution section in opposite directions from the center of said shell, said shell is turned and positioned by mechanical means to match said circulation section with the front section of the body to cut grass and to mulch cut grass clippings into the cut grass, said shell is turned and positioned by mechanical means to match the front section of the body with said distribution section to cut grass and to discharge and collect cut grass clippings, a rotary blade powered by said power source and connected to said shell, a positioning device connected to said shell and to said body, a collection port connected to circulation section of said shell.

2. Apparatus as set forth in claim 1 which includes a rotary blade connected to said shell and set at an angle relative to ground beneath said shell.

3. Apparatus as set forth in claim 1 which includes a secondary discharge shell connected to said multidirectional shell and said body.

4. Apparatus as set forth in claim 1 which includes a collection bag connected to said multidirectional shell and said body.

5. Apparatus as set forth in claim 1 which includes at least two wheels connected to said multidirectional shell.

6. Apparatus as set forth in claim 1 includes a main connector comprising a universal joint and said main connector positions said multidirectional shell including an angle of said multidirectional shell relative to the ground.

7. Apparatus as set forth in claim 1 which includes a collection port cover connected to said collection port.

* * * * *